(12) United States Patent
Asanuma et al.

(10) Patent No.: US 11,123,641 B2
(45) Date of Patent: Sep. 21, 2021

(54) INFORMATION PROCESSING DEVICE, SERVER DEVICE, PARENTAL CONTROL METHOD, PROFILE INFORMATION MANAGEMENT METHOD

(71) Applicant: Sony Interactive Entertainment Inc., Tokyo (JP)

(72) Inventors: Itsuki Asanuma, Tokyo (JP); Makoto Oshita, Tokyo (JP); Seiichi Adachi, Tokyo (JP); Marc Horne, San Mateo, CA (US); Hidekazu Ii, San Mateo, CA (US); Yoshihiko Suwa, Tokyo (JP); Shigeru Enomoto, Tokyo (JP); Syunsuke Bamba, Tokyo (JP); Kei Sato, Tokyo (JP); Kenjiro Komaki, Tokyo (JP); Fumikazu Hatanaka, Tokyo (JP)

(73) Assignees: Sony Interactive Entertainment Inc., Tokyo (JP); Sony Interactive Entertainment LLC, San Mateo, CA (US)

( * ) Notice: Subject to any disclaimer, the term of this patent is extended or adjusted under 35 U.S.C. 154(b) by 227 days.

(21) Appl. No.: 15/878,616

(22) Filed: Jan. 24, 2018

(65) Prior Publication Data
US 2019/0022533 A1    Jan. 24, 2019

Related U.S. Application Data

(60) Provisional application No. 62/536,003, filed on Jul. 24, 2017.

(51) Int. Cl.
*A63F 13/79* (2014.01)
*A63F 13/48* (2014.01)
*H04N 21/45* (2011.01)
*H04N 21/454* (2011.01)
*H04N 21/475* (2011.01)
*H04N 21/258* (2011.01)
*H04N 21/478* (2011.01)

(52) U.S. Cl.
CPC .............. *A63F 13/79* (2014.09); *A63F 13/48* (2014.09); *H04N 21/25891* (2013.01); *H04N 21/454* (2013.01); *H04N 21/4532* (2013.01); *H04N 21/4751* (2013.01); *H04N 21/4781* (2013.01)

(58) Field of Classification Search
CPC ........... A63F 13/45; A63F 13/70; A63F 13/79
See application file for complete search history.

(56) References Cited

U.S. PATENT DOCUMENTS

| | | | |
|---|---|---|---|
| 2004/0051733 A1* | 3/2004 | Katzir | G06F 21/34 715/741 |
| 2013/0061260 A1* | 3/2013 | Maskatia | G07F 17/005 725/28 |
| 2016/0142776 A1* | 5/2016 | Meijer | H04L 12/2812 725/28 |
| 2016/0366147 A1* | 12/2016 | Nguyen | H04N 21/4532 |
| 2019/0319956 A1* | 10/2019 | Yang | H04W 12/0804 |

* cited by examiner

*Primary Examiner* — James S. McClellan
(74) *Attorney, Agent, or Firm* — Matthew B. Dernier, Esq.

(57) ABSTRACT

There is provided an information processing device including a holding unit configured to hold setting information regarding parental control for each user in association with user identification information, and a limit processing unit configured to limit usage of a predetermined function or device by the user on a basis of the setting information held by the holding unit.

10 Claims, 17 Drawing Sheets

FIG. 9

Play Time for Today

Remaining      00:05 ← 510

Play Time for Today      2hrs | 9:00AM – 9:00PM ← 512

Time Played Today      01:55 ← 514

[ OK ]

USER D

4

⊗ Enter

INFORMATION PROCESSING DEVICE, SERVER DEVICE, PARENTAL CONTROL METHOD, PROFILE INFORMATION MANAGEMENT METHOD

BACKGROUND

The present disclosure relates to a technology for performing a parental control function.

In an information processing device such as a game machine, a parental control function on which a guardian such as a parent imposes use restriction has been implemented for a game play or viewing of contents including violent expressions or sexual expressions that may have an adverse effect on a child. The use restriction implemented on the game machine as a standard is also referred to as a parental lock. In recent years, since the game machine is connected to the Internet all the time in a general way, in addition to the use restriction of games or contents, the guardian is enabled to impose the use restriction also on communication application with other users.

SUMMARY

However, according to the parental control function of an existing game machine, the use restriction set to a child is applied to not only the child but also the parent. That is, when the parental control function is set, the use restriction becomes effective in a game machine body, and therefore the parental lock is desired to be canceled once even in the parent in order to perform the game play or content viewing on which the use restriction is imposed depending on an age of the child. Therefore, the parental control function in the existing game system is not necessarily user-friendly and there is room for improvement. Further, not only the use restriction according to a kind of contents but also the restriction regarding a use mode of a game machine through children is enabled to be imposed, and thereby parents allow the children to use a game machine in relief.

Therefore, there is a need for a technology for improving a usability of a parental lock function.

In order to solve the problem described above, the information processing device according to an embodiment of the present disclosure includes a holding unit configured to hold setting information regarding parental control for each user in association with user identification information; and a limit processing unit configured to limit usage of a predetermined function or device by the user on the basis of the setting information held by the holding unit.

Another embodiment of the present disclosure is a parental control method including holding setting information regarding parental control for each user in association with user identification information; and limiting usage of a predetermined function or device by the user on the basis of the held setting information.

A still another embodiment of the present disclosure is a program for a computer, including holding, by a holding unit, setting information regarding parental control for each user in association with user identification information, and limiting, by a limit processing unit, usage of a predetermined function or device by the user on a basis of the held setting information.

A still another embodiment of the present disclosure is a server device including a sign-in registration unit configured to carry out a sign-in registration process of a network service of a user of an information processing device; and a profile management unit configured to manage profile information of the user in association with a network account of the user, in which the profile management unit holds setting information regarding parental control in association with the network account.

A still another embodiment of the present disclosure is a profile information management method. This method includes carrying out a sign-in registration process of a network service of a user of an information processing device; and holding setting information regarding parental control as profile information of the user in association with a network account of the user.

A still another embodiment of the present disclosure is a program for a computer, including carrying out, by a sign-in registration unit, a sign-in registration process of a network service of a user of an information processing device, and holding, by a profile management unit, setting information regarding parental control as profile information of the user in association with a network account of the user.

It is to be noted that also arbitrary combinations of the constituent elements described above and the representations of the present disclosure obtained by conversion thereof between a method, a device, a system, a recording medium, a computer program, and the like are effective as embodiments of the present disclosure.

BRIEF DESCRIPTION OF THE DRAWINGS

FIG. 9 is a diagram illustrating an example of a detailed screen regarding a play time;

DETAILED DESCRIPTION OF THE PREFERRED EMBODIMENT

Figure 1:
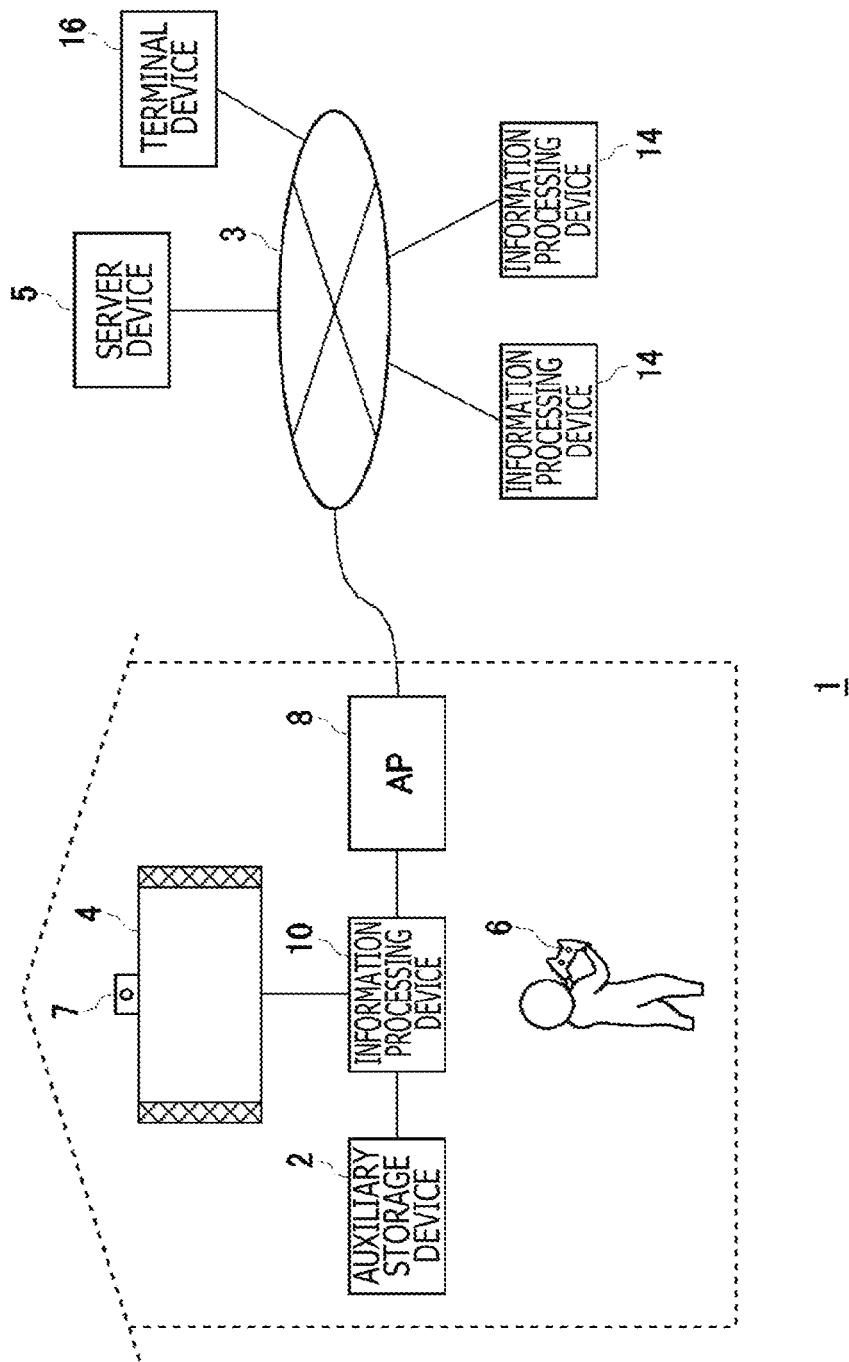
FIG. 1 is a diagram illustrating an information processing system according to an embodiment of the present disclosure.

FIG. 1 illustrates an information processing system 1 according to an embodiment of the present disclosure. The information processing system 1 includes an information processing device 10 used by a user, a server device 5, an information processing device 14 used by a user, and a terminal device 16 used by a user. The information processing device 10 and the information processing device 14 in the embodiment are user terminals that include at least an execution function of games and include a similar configuration and function. The terminal device 16 is a user terminal having a network communication function, such as a portable phone including a smartphone, a tablet, or a personal computer. In the embodiment, parental controls of the user who uses the information processing device 10 will be described.

An auxiliary storage device 2 is a large capacity storage device such as an HDD (Hard Disk Drive) or a flash memory. The auxiliary storage device 2 may be an external storage device connected to the information processing device 10 by a USB (Universal Serial Bus) or the like or may be a built-in type storage device. An output device 4 may be a television set having a display that outputs an image and a speaker that outputs sound or may be a computer display. The output device 4 may be connected to the information processing device 10 by a wire cable or by wireless connection. The information processing device 10 is connected in a wireless or wired manner to an input device 6 operated by the user and the input device 6 outputs an operation signal indicating operation results of the user to the information processing device 10. When receiving the operation signal from the input device 6, the information processing device 10 reflects the operation signal on the process of OS (system software) or application such as game and outputs the process results from the output device 4. The input device 6 includes a plurality of input units such as a plurality of operation buttons of the push type, an analog stick that can input an analog quantity, and turning buttons.

The information processing device 10 is a user terminal having a function of executing various types of application and may be, for example, a stationary game device. The input device 6 is a device that provides operation signals of the user for the information processing device 10 and may be, for example, a game controller, and an input interface such as a keyboard or a mouse. A camera 7 that is an imaging device is provided in the vicinity of the output device 4 and images a space on the periphery of the output device 4.

An access point (hereinafter, referred to as "AP") 8 has functions of a wireless access point and a router, and the information processing device 10 is connected to the AP 8 by a wireless or wire connection and is connected so as to be communicated with the server device 5 on a network 3.

In the information processing device 10, user identification information (user ID) of the user who uses the information processing device 10 is registered. The user ID is a local account for using the information processing device 10. The user logs in to the information processing device 10 by using the user ID to thereby use functions of the information processing device 10.

The server device 5 provides a network service for the user of the information processing system 1. The server device 5 may be physically composed of a plurality of servers and each of the servers may be maintained or managed by entities according to respective functions. The server device 5 manages a network account for identifying the user, and the user signs in to the network service provided by the server device 5 by using the network account.

The information processing device 10 holds user information such as authentication information (token) for signing in to the user ID (local account), the network account or the network service for each user. As described above, the user ID is used at the time when the user logs in to the information processing device 10, and on the other hand the network account is used at the time when the user signs in to the server device 5. Note that the fact of logging in to the information processing device 10 means a status in which the user is identified by the local account by using OS and the user logs in to the information processing device 10 to thereby access resources of the information processing device 10. Further, the user signs in to the network service and thereby can register saved data of a game or a trophy that is a virtual prize acquired during a game play in the server device 5.

The server device 5 provides various service functions for the user, and in the embodiment, a mechanism in which the server device 5 manages a parental control function in the information processing device 10 will be described.

Figure 2:
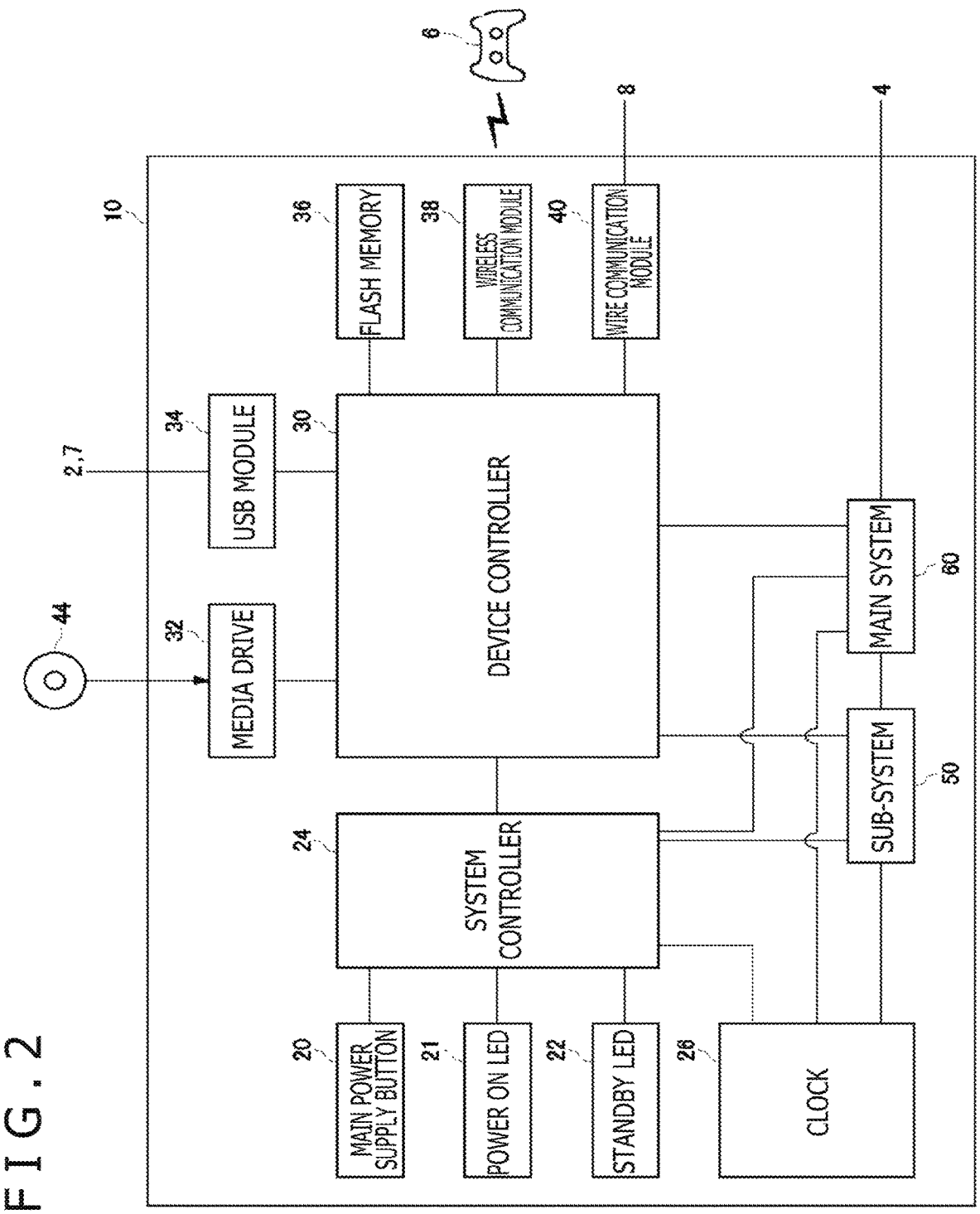
FIG. 2 is a diagram illustrating functional blocks of an information processing device.

FIG. 2 illustrates a functional block diagram of the information processing device 10. The information processing device 10 includes a main power supply button 20, a power ON LED (Light Emitting Diode) 21, a standby LED 22, a system controller 24, a clock 26, a device controller 30, a media drive 32, a USB module 34, a flash memory 36, a wireless communication module 38, a wire communication module 40, a sub system 50, and a main system 60.

The main system 60 includes a main CPU (Central Processing Unit), a memory that is a main storage device and a memory controller, a GPU (Graphics Processing Unit), and the like. The GPU is utilized principally for arithmetic processing of a game program. Those functions may be configured as a system-on-chip and formed on one chip. The main CPU has a function for executing game software recorded in the auxiliary storage device 2 or a ROM (Read Only Memory) medium 44.

The sub system 50 includes a sub CPU, a memory that is a main storage device, a memory controller, and the like, but does not include a GPU and does not have a function for executing a game program. The number of circuit gates of the sub CPU is smaller than the number of the circuit gates of the main CPU, and the operation power consumption of the sub CPU is lower than the operation power consumption of the main CPU. The sub CPU operates also while the main CPU is in a standby state and is limited in processing function thereof so as to suppress the power consumption low.

The main power supply button 20 is a button through which an operation input is performed by a user and is provided on the front face of the housing of the information processing device 10, and further the main power supply button 20 is operated in order to turn on or off power supply to the main system 60 of the information processing device 10. The power ON LED 21 is turned on when the main power supply button 20 is switched on, and the standby LED 22 is turned on when the main power supply button 20 is switched off.

The system controller 24 detects depression of the main power supply button 20 by the user. If the main power supply button 20 is depressed when the main power supply is in an off state, then the system controller 24 acquires the depression operation as a "turn on instruction," and on the other hand, if the main power supply button 20 is depressed when the main power supply is in an on state, then the system controller 24 acquires the depression operation as a "turn off instruction."

The clock 26 is a real time clock and generates date and time information at present and supplies the generated information to the system controller 24, sub system 50, and main system 60.

The device controller 30 is configured as an LSI (Large-Scale Integrated Circuit) that performs a delivery of information between devices like a south bridge. As illustrated in the figure, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic or a difference in data transfer rate between the respective devices and controls the timing of data transfer.

The media drive 32 is a drive device which operates the ROM medium 44, on which application software of a game or the like is recorded, loaded thereon to read out a program, data, and the like from the ROM medium 44. The ROM medium 44 is a read-only recording medium such as an optical disk, a magneto-optical disk or a Blu-ray disk.

The USB module 34 is a module to be connected to external equipment by a USB cable. The USB module 34 may be connected to the auxiliary storage device 2 and the camera 7 by a USB cable. The flash memory 36 is an auxiliary storage device that configures an internal storage. The wireless communication module 38 wirelessly communicates, for example, with the input device 6 using a communication protocol such as a Bluetooth (registered trademark) protocol or an IEEE (Institute of Electrical and Electronic Engineers) 802.11 protocol. The wire communication module 40 wire-communicates with external equipment and is connected to the network 3 through the AP 8. Note that the wireless communication module 38 may be connected to the network 3 through the AP 8.

In the information processing device 10, one user becomes a manager and gathers a plurality of users to form one group. In the embodiment, a mechanism in which a parent performs setting regarding the parental control of a child in the group will be described.

Figure 3:
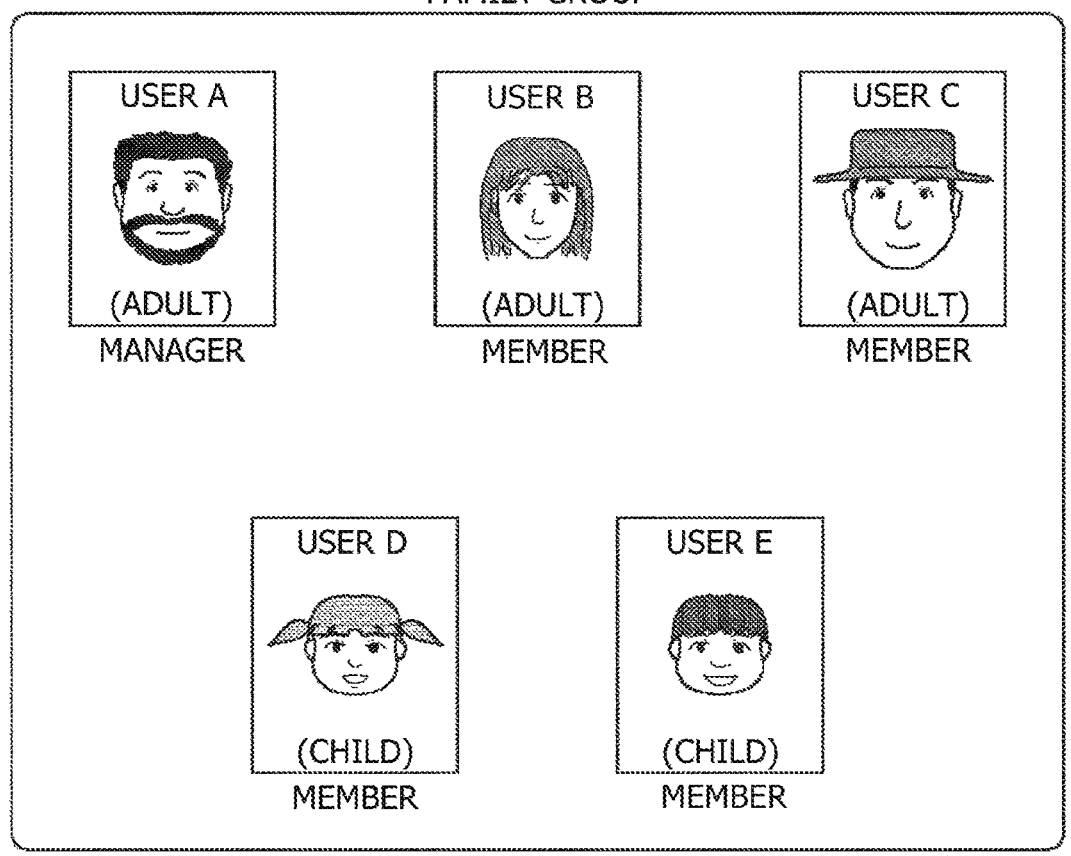
FIG. 3 is a diagram illustrating an example of a group composed of a plurality of users.

FIG. 3 is a diagram illustrating an example of the group composed of a plurality of users. It is assumed that a family member fundamentally belongs to this group and the group is referred to as a "family group." In the family group, one user of an adult is a family manager, and the family manager appeals to other users to join in the family group; further, the other users agree with the appeal and thereby the family group is established. The users belonging to the family group is divided into an adult and a child depending on user's age.

The family manager sends an invitation to the family group to the user of an adult and the user who receives the invitation accepts the invitation and thereby the user becomes a member of the family group. The family manager can send the invitations to other users who are registered as the user in the information processing device 10, that is, the users who are registered in a friend list, or the like. In addition, the family manager registers, as the member of the family group, children or adults who are not registered as the user in the information processing device 10 and this process permits a new user to join in the family group.

In an example illustrated in FIG. 3, a user A is registered in the information processing device 10 as the family manager and the other users B to E are registered in the information processing device 10 as the family member. Information regarding the family group is managed while synchronized with the server device 5. The family manager has various authorities in relation to management of the family group, and in the embodiment, the setting authority regarding the parental control that the family manager has will be described from among the various authorities.

In the example illustrated in FIG. 3, the users B and C are adults and the users D and E are children. Whether the user is an adult or a child is determined by a law of a country in which the information processing device 10 is installed. In the United States, for example, it is legally determined that the user of 18 years and over is an adult and the user of under 18 years is a child.

When a child performs a registration work including the network account, there is an item that is incapable of being legally performed by only the child, such as an agreement with the license agreements; therefore, before the child performs his/her own registration work, the family manager registers a portion of profile information of the child in the information processing device 10. At this time, the family manager registers that the child's own user registration work is approved in advance as the manager, and at the same time registers also the setting information regarding the parental control of the child. At this time point, the user registration of the child to the information processing device 10 is completed but the sign-in registration to the server device 5 is not completed.

Hereinafter, the user in this state is referred to as an "offline profile user." The offline profile user is a local user who does not have an account of the network service; however, the offline profile user belongs to the family group and the user's own sign-in registration has been pre-approved by the manager. Since the offline profile user does not have the network account, the profile information of the offline profile user is managed in association with the network account of the family manager in the server device 5. Then, when the child carries out a child's own sign-in registration process, the network account of the child is prepared by the server device 5, and therefore the profile information of the child is deflected from the network account of the manager and is managed in association with the network account of the child.

As described above, the family group illustrated in FIG. 3 is formed. Here, it is assumed that after the offline profile is set, the user D carries out a user's own sign-in registration process and has the network account; on the other hand, the user E does not carry out the sign-in registration process yet and is the offline profile user who does not have the network account.

In the family group, the family member of an adult other than the family manager is enabled to be registered as the user having the setting authority regarding the parental control by a designation of the family manager. The user who is designated by the family manager and has the setting authority regarding the parental control is referred to as a "guardian."

Figure 4:
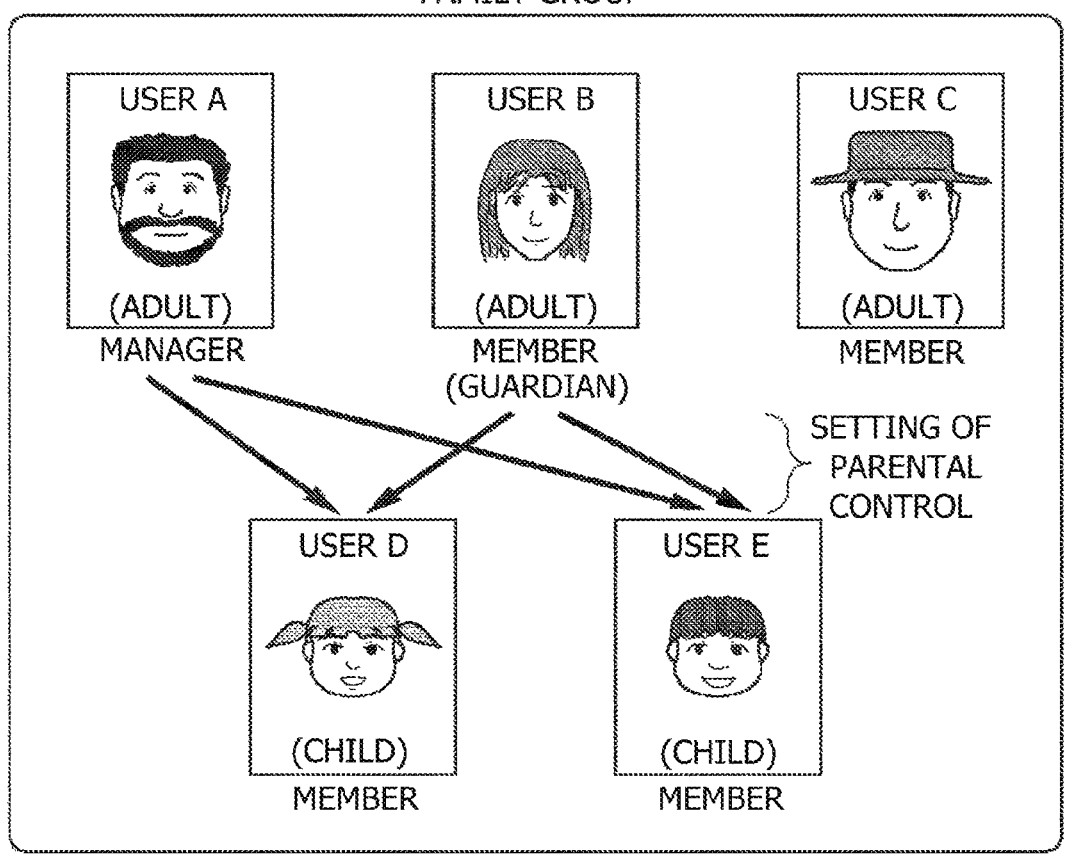
FIG. 4 is a diagram for describing setting regarding parental control in a family group.

FIG. 4 is a diagram for describing the setting regarding the parental control in the family group. In the family group, the family manager has the setting authority regarding the parental control, and in addition, the guardian also has the setting authority regarding the parental control. For example, when a father is the manager, a mother is set to the guardian and two persons have the setting authority regarding the parental control to thereby perform flexibly a change in the setting information regarding the parental control or the like.

Figure 5:
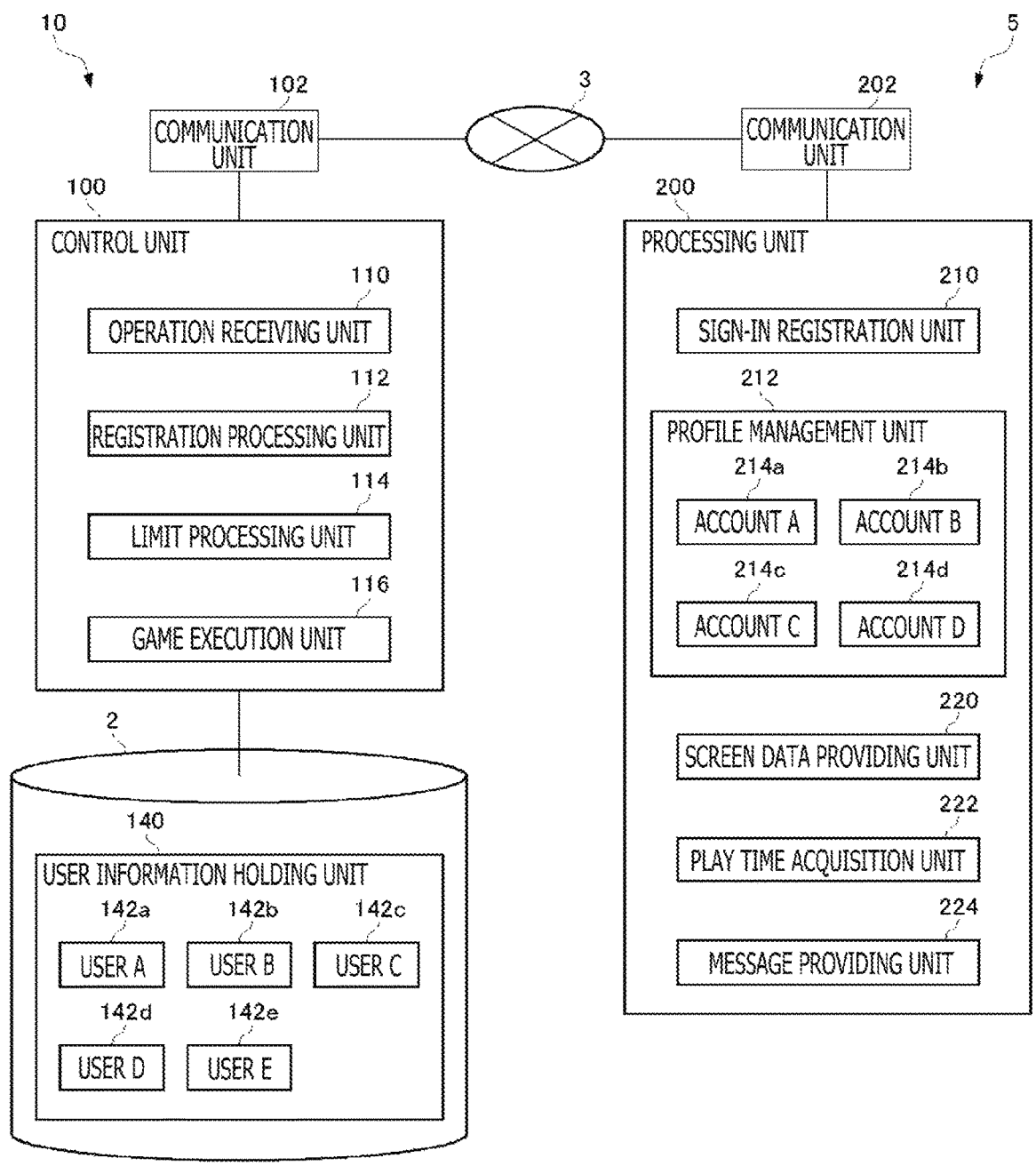
FIG. 5 is a diagram illustrating configurations of the information processing device and a server device.

FIG. 5 illustrates configurations of the information processing device 10 and the server device 5. The information processing device 10 includes a communication unit 102 and a control unit 100. The control unit 100 has an operation receiving unit 110, a registration processing unit 112, a limit processing unit 114, and a game execution unit 116. The communication unit 102 indicates functions of the wireless communication module 38 and wire communication module 40 illustrated in FIG. 2.

The server device 5 includes a communication unit 202 and a processing unit 200. In FIG. 5, the processing unit 200 has a configuration including also an auxiliary storage device and includes a sign-in registration unit 210, a profile management unit 212, a screen data providing unit 220, a play time acquisition unit 222, and a message providing unit 224. The communication unit 102 of the information processing device 10 and the communication unit 202 of the server device 5 mutually transmit and receive data through the network 3.

Each component described as functional blocks that execute various processes in FIG. 5 can be configured, in hardware, from circuit blocks, memories, and other LSIs and is implemented, in software, by a program loaded in a memory and the like. Accordingly, it is understood by those skilled in the art that the functional blocks can be implemented in various forms from only hardware, only software or a combination of them and are not limited to any of them.

First, the users A to C of the adults are each assumed to have done with the user registration in the information processing device 10 and the sign-in registration in the server device 5. The user registration and the sign-in registration are carried out at the initial setting time of the user, and specifically, the registration processing unit 112 of the control unit 100 and the sign-in registration unit 210 of the processing unit 200 carry out the user registration and the sign-in registration in accordance with input operations from each user.

In this state, the user A invites the user B and the user C to the family group as the family manager, and the user B and the user C receive the invitation from the user A and participate in the family group. Further, the user A designates the user B to the guardian having the setting authority regarding the parental control of the children in the family group. The registration processing unit 112 stores in a user information holding unit 140 that the users B and C are members of the family group and the user B is the guardian.

The user A registers as the offline profile user the users D and E who are the children in the information processing device 10. At this time, the user A sets the parental control to the users D and E. Note that the setting regarding the parental control is not limited at the time of the user registration of the children and can be performed from a predetermined setting screen at arbitrary timing after the user registration. As described above, after the user D is registered as the offline profile user by the user A, a user's own sign-in registration work is performed by the user D. This process permits the sign-in registration unit 210 to register the network account of the user D and the profile management unit 212 to manage the user D as an online user.

Figure 6:
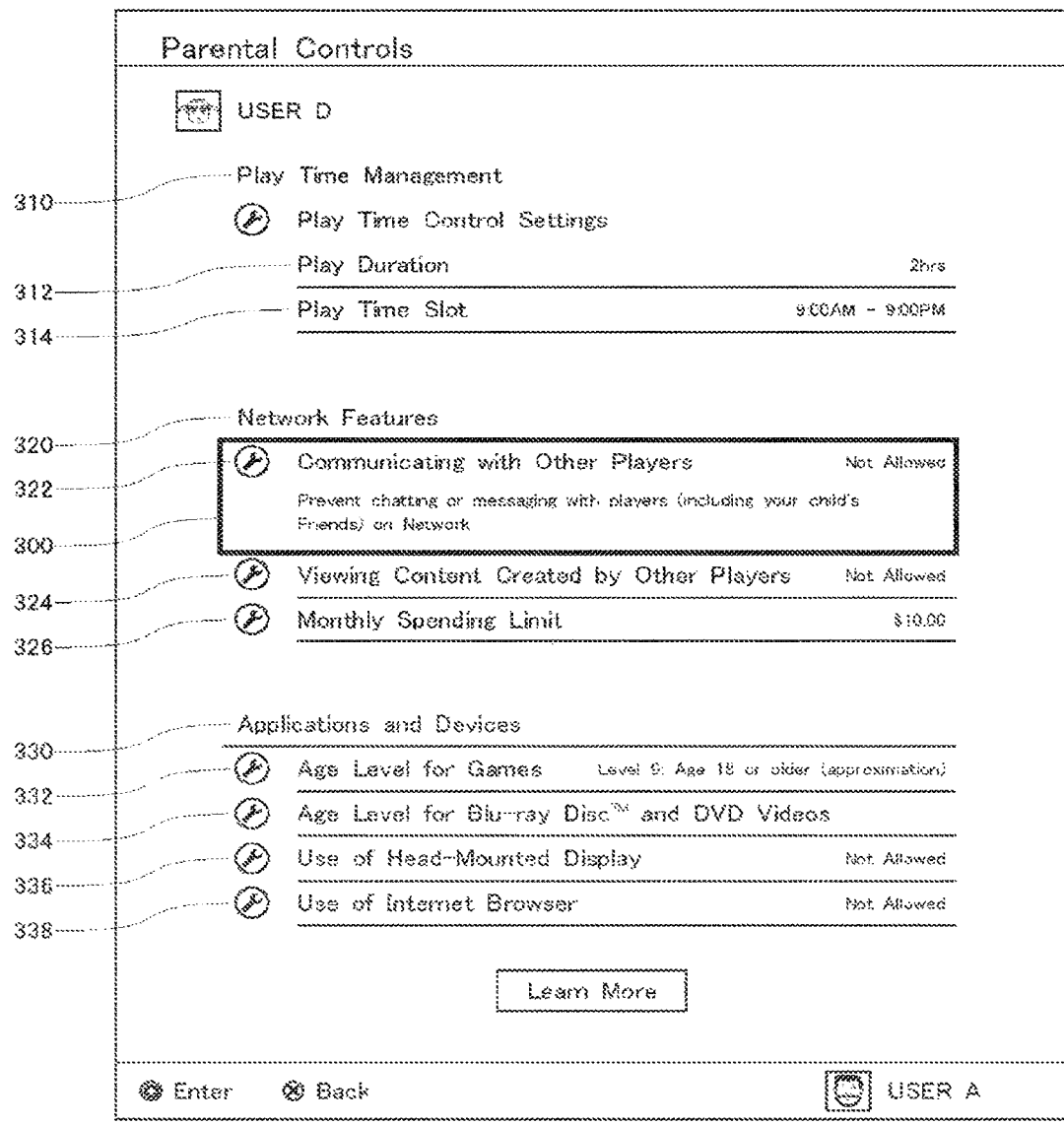
FIG. 6 is a diagram illustrating an example of a setting screen regarding the parental control.

FIG. 6 illustrates an example of a setting screen of the parental controls. Here, there is illustrated an example in which the user A sets information regarding the parental controls of the user D from the information processing device 10. In addition, the user A can set also information regarding the parental controls of the user E in a similar manner. Further, the user A can also set information regarding the parental controls from the terminal device 16.

In the setting screen of the parental controls, a focus frame 300 is an indicator for selecting an item and the user A operates the input device 6, selects the focus frame 300 in accordance with an input item, and sets parental control information to the selected item. The user A may set the parental control information to all the items but set the parental control information to only a portion of the items. Hereinafter, each item will be described.

A play time management column 310 is a column for managing a play time of the users who are the children. A play time setting item 312 is an item for setting an upper limit (play permission time) of a game play time of the information processing device for the children in one day and is set as a total time including not only the game play time in the information processing device 10 but also the game play time in other user terminals (for example, the information processing device 14). In an example illustrated in FIG. 6, the play permission time is set to "two hours" in the play time setting item 312 and this means that the play permission time for the user D to use the information processing device in one day is determined to be "two hours." For example, when the user D plays a game for an hour by using the information processing device 10, then goes to her friend's house, and plays a game for an hour with her friend by using the information processing device 14, it is determined by the server device 5 that a utility time of the information processing device 10 by the user D reaches two hours of an upper limit. At this time, by using various modes, the server device 5 or the information processing device 14 may notify the user D or the user having the setting authority of the parental controls that the utility time of the user D reaches the upper limit.

A play period setting item 314 is an item for setting a play time slot of the information processing device in one day. The play time slot indicates a range of a playable time of the user D in one day and the play time slot is set between nine o'clock in the morning and nine o'clock at night in the example illustrated in FIG. 6. This means that the user D may not play a game from nine o'clock at night to nine o'clock on the following morning. Note that the play time setting item 312 and the play period setting item 314 may be enabled to be set in each day of the week. This process permits fine parental controls to be set.

A network management column 320 is a column for managing behaviors in relation to the network of the users who are the children. A communication application setting item 322 is an item for setting whether or not to utilize a chat service or message service with other users. A viewing application setting item 324 is an item for setting whether or not to utilize a viewing service of contents prepared by other users. A spending money setting item 326 is an item for setting money spendable for the children for each month from among a purse charged by the parent.

A function and device management column 330 is a column for managing a limit of usage for a predetermined function or device by the users who are the children. Here, the function includes a function implemented by application. An age level setting item 332 is an item for setting a parental level in relation to games and an age level setting item 334 is an item for setting the parental level in relation to videos. An HMD (Head-Mounted Display) setting item 336 is an item for setting whether or not to utilize a device, here, a head-mounted display. An internet browser setting item 338 is an item for setting whether or not to utilize an internet browser.

As described above, the user A who is the family manager sets the parental control information for each child belonging to the family group. Note that, in the embodiment, also the user B who can behave as the guardian designated by the user A can set the parental control information for each child. A parental lock set for the child is applied to only the aforementioned child and does not have an influence on the other users. In addition, in relation to the setting regarding the parental control information, the family manager and the guardian have the same authority and accordingly, the guardian can freely change the parental control information set by the family manager and the family manager can freely change the parental control information set by the guardian.

With reference to FIG. 5, the registration processing unit 112 allows the user information holding unit 140 to hold the user information such as authentication information (token) for signing in to the network account or network service in association with the user ID. User information 142a represents the user information regarding the user A, user information 142b represents the user information regarding the user B, user information 142c represents the user information regarding the user C, user information 142d represents the user information regarding the user D, and user information 142e represents the user information regarding the user E.

The user information holding unit 140 holds the setting information regarding the parental control in association with the user IDs of the children, specifically, the user IDs of the users under a predetermined age in the family group. In the embodiment, the parental locks are put on the respective users D and E, and accordingly the individually set parental control information is included in the user information 142d and 142e. The limit processing unit 114 limits the usage of a predetermined function or device by the user on the basis of the setting information regarding the parental control held by the user information holding unit 140.

In the embodiment, the user information holding unit 140 holds the parental control information set for each user to the respective users D and E, and therefore the limit processing unit 114 can individually limit the usage of the function and device by the users D and E. Note that the limit processing unit 114 individually performs the usage limit of the function and device to the users D and E and does not perform the usage limit by the parental control to the other users A to C.

In the server device 5, the sign-in registration unit 210 carries out the sign-in registration process of the network service of the users of the information processing device 10. The sign-in registration unit 210 registers the network account of the users in the profile management unit 212. The profile management unit 212 manages the profile information of the users in association with the network account of the users. The profile information of the users includes the user information managed by the information processing device 10.

As described above, the users A to D have the network account but the user E is the offline profile user and does not have the network account. Since the sign-in registration unit 210 does not register the network account of the user E, the profile management unit 212 may not manage the profile information of the user E under normal circumstances; however, the user E belongs to the family group of the user A, and therefore the profile management unit 212 manages the profile information of the user E in association with the network account of the user A.

Profile information 214a represents the profile information (user information) regarding the user A, profile information 214b represents the profile information (user information) regarding the user B, profile information 214c represents the profile information (user information) regarding the user C, and profile information 214d represents the profile information (user information) regarding the user D. As described above, in the profile information 214a, the profile information of the user E who is the offline profile user is also included in addition to the profile information of the user A. In the profile information of the users D and E, the setting information regarding the parental control is included.

The setting information regarding the parental control can be changed by the user A who is the family manager and the user B who is the guardian. The users A and B log in to the information processing device 10 and allow the output device 4 to display the setting screen regarding the parental control illustrated in FIG. 6 and the setting information regarding the parental control to be changed.

As described below, the users A and B can perform a change in the setting information regarding the parental control from the terminal devices 16 other than the information processing device 10. Each of the users A and B registers information regarding the terminal device 16 such as a smartphone or tablet in the profile management unit 212 in association with the network account as a portion of the profile information. That is, in the profile information 214a, the information regarding the terminal device 16 used by the user A is registered and in the profile information 214b, the information regarding the terminal device 16 used by the user B is registered. The user A or B allows the individually registered terminal devices 16 to display the setting (change) screen regarding the parental control of the children in the family group.

The server device 5 includes the screen data providing unit 220 that provides the screen data for performing the setting or setting change regarding the parental control for the information processing device 10 and the terminal device 16 of the manager or guardian. The screen data providing unit 220 transmits setting screen data regarding the parental control to the information processing device 10 or the terminal device 16 by a request from the manager or guardian. The manager or the guardian requests, from the information processing device 10 or the terminal device 16, the server device 5 to transmit the setting screen of the parental controls. Further, the screen data providing unit 220 transmits the setting screen data regarding the parental controls to the information processing device 10 or the terminal device 16 that has performed a transmission request. Through this process, the manager or guardian can set or change the parental control information from the setting screen displayed on the display device. The setting screen may be the same as the setting screen illustrated in FIG. 6.

The set or changed information in the setting screen of the terminal device 16 is transmitted from the terminal device 16 to the profile management unit 212 of the server device 5 and the profile management unit 212 updates the parental control information of the user of the aforementioned child. At this time, the profile management unit 212 notifies the information processing device 10 of the updated information. The registration processing unit 112 of the information processing device 10 receives an update of the setting information regarding the parental control and updates the setting information regarding the parental control held by the user information holding unit 140. This process permits the parental control information to be synchronized with each other between the user information holding unit 140 and the profile management unit 212.

When the upper limit (play permission time) of the play time of the game is set as the parental control information, the limit processing unit 114 measures the play time for today of the user. In the play time setting item 312 in FIG. 6, the play permission time of the user D is set to two hours. When the remaining time of the play permission time of the user D is a predetermined time, the limit processing unit 114 gives notice of the above fact from the output device 4.

Referring back to FIG. 5, the game execution unit 116 of the information processing device 10 executes a game program on the basis of an operation input of the input device 6 by the user and outputs a game screen and a game audio from the output device 4.

Figure 7:
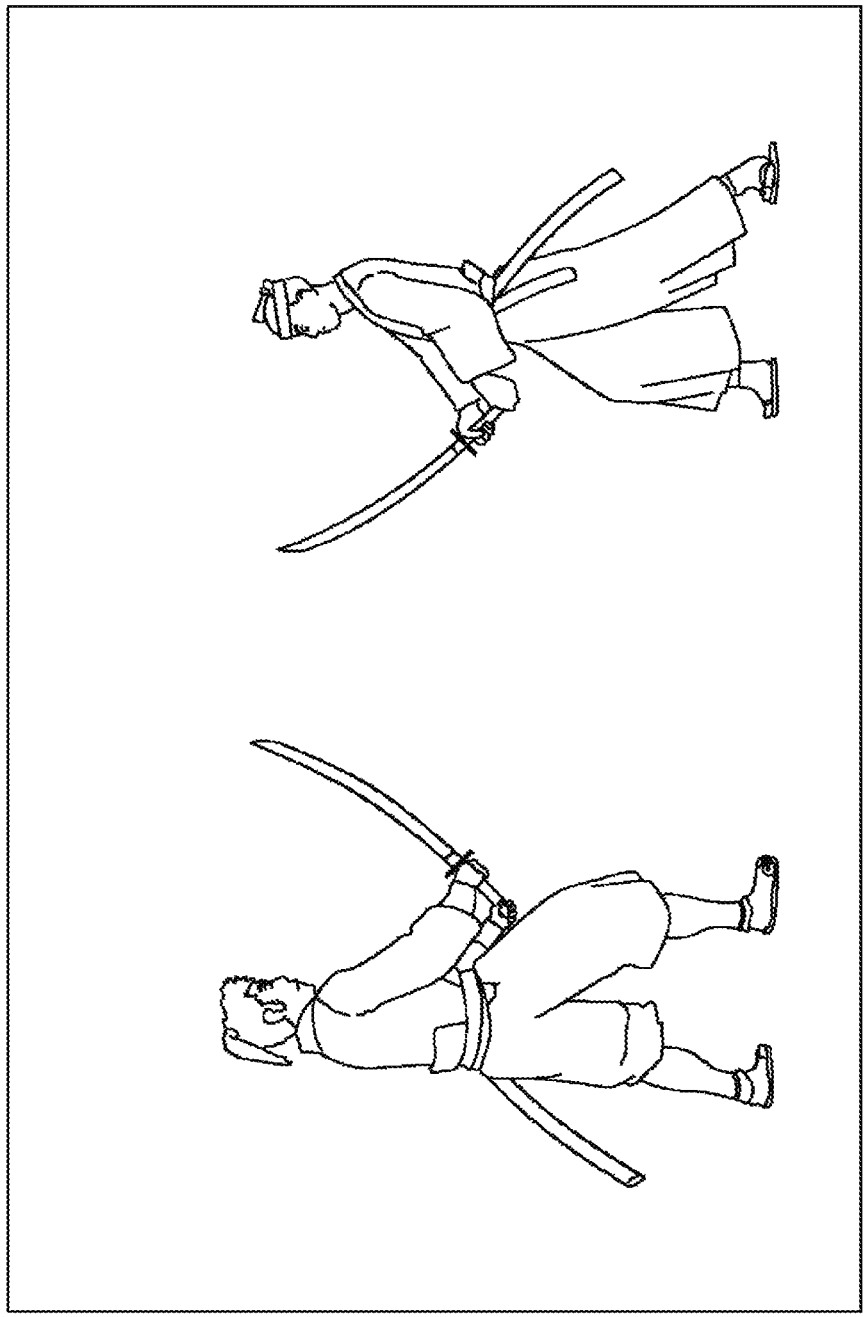
FIG. 7 is a diagram illustrating an example of a game screen output to an output device.

FIG. 7 illustrates an example of the game screen output to the output device 4. Hereinafter, behavior of the information processing system 1 at the time when the user D logs in to the information processing device 10 to start up a game and operates the input device 6 to play a game will be described. For the user D, the play permission time in one day is set to "two hours."

The limit processing unit 114 measures the play time in one day of the user D. The play time acquisition unit 222 of the server device 5 regularly acquires the play time of the user D measured by the limit processing unit 114. Through this process, the play time of the user D is synchronized between the information processing device 10 and the server device 5. In addition, when the user D already plays a game today, the play time acquisition unit 222 transmits the past play time for today to the information processing device 10 at the time of starting the game by the user D. The past play time for today is, for example, the time obtained by accumulating the play time in the case in which the user performs a game play by using the information processing device 10 or the information processing device 14 before this game play. This process permits the limit processing unit 114 to confirm an accumulated play time for today by the user D.

When a remaining time of the play permission time is a predetermined time, the limit processing unit 114 generates a message regarding the remaining time and superimposes and displays the message on the game screen.

Figure 8:
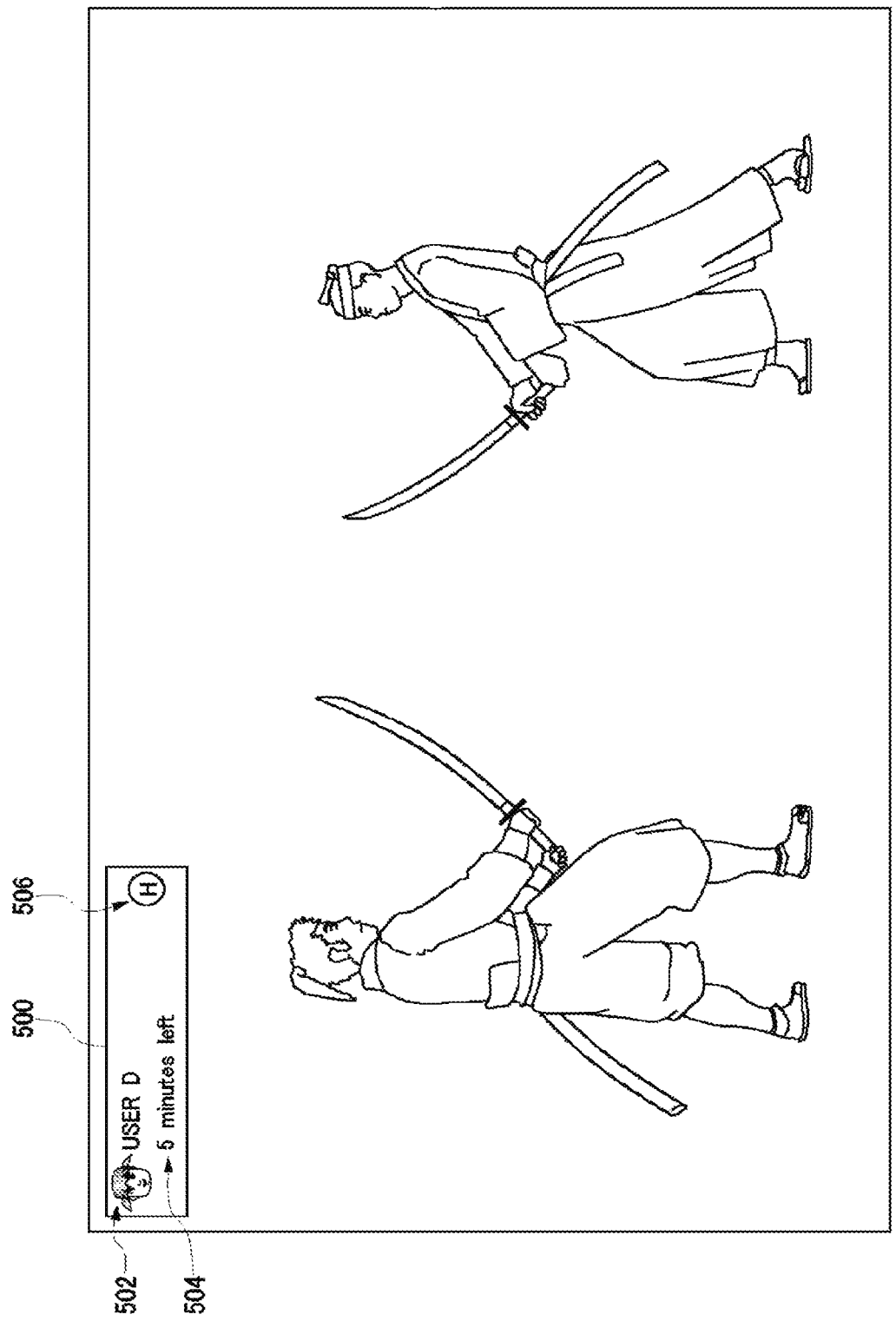
FIG. 8 is a diagram illustrating an example of a message superimposed and displayed on the game screen.

FIG. 8 illustrates an example of the message superimposed and displayed on the game screen. The limit processing unit 114 displays a message window 500 on the upper-left corner of the game screen. The message window 500 includes user specification information 502 for specifying the user D that is a notification destination of a message and a message 504 indicating the remaining time by a text. For example, in the case in which the user D and the user E who are subjected to a play time management play a game together, the play time is measured separately for each of the users D and E. Therefore, information for specifying the user that is a notification destination of the message 504 is displayed along with the message 504 to thereby confirm that the remaining time of which user is indicated.

In this example, the message 504 indicates "five minutes left," and that the remaining time of the play permission time is five minutes. In addition, the limit processing unit 114 may stepwise display the message 504 indicating the remaining time. The message 504 is stepwise displayed in accordance with the remaining time, for example, 30 minutes left, 15 minutes left, ten minutes left, and five minutes left, and thereby the user can play a game while confirming the remaining time. Note that, in order to facilitate visualization of characters within the window, the message window 500 may preferably have a single color, for example, a white background. Further, the user specification information 502 and the message 504 may be directly superimposed and displayed on the game screen.

A home button mark 506 indicates a predetermined button (home button) in the input device 6 and indicates, when the user D depresses (short push operation) the home button, that the game screen is switched. When the user D performs a short push operation on the home button of the input device 6, the limit processing unit 114 displays a detailed screen regarding the play time on the output device 4 in place of the game screen.

FIG. 9 illustrates an example of the detailed screen regarding the play time. In a remaining time display column 510, the remaining time of the play permission time for today is displayed on the detailed screen. In this example, it is indicated that the remaining time of the play permission time is five minutes. In a play permission time display column 512, the play permission time and the play time slot for today are displayed. In a play time display column 514, the accumulated play time for today is displayed. When the user D operates a predetermined button (enter button), the limit processing unit 114 switches the display screen to the game screen.

When the remaining time of the play permission time is eliminated, the limit processing unit 114 generates a message indicating the above fact and superimposes and displays the message on the game screen.

Figure 10:
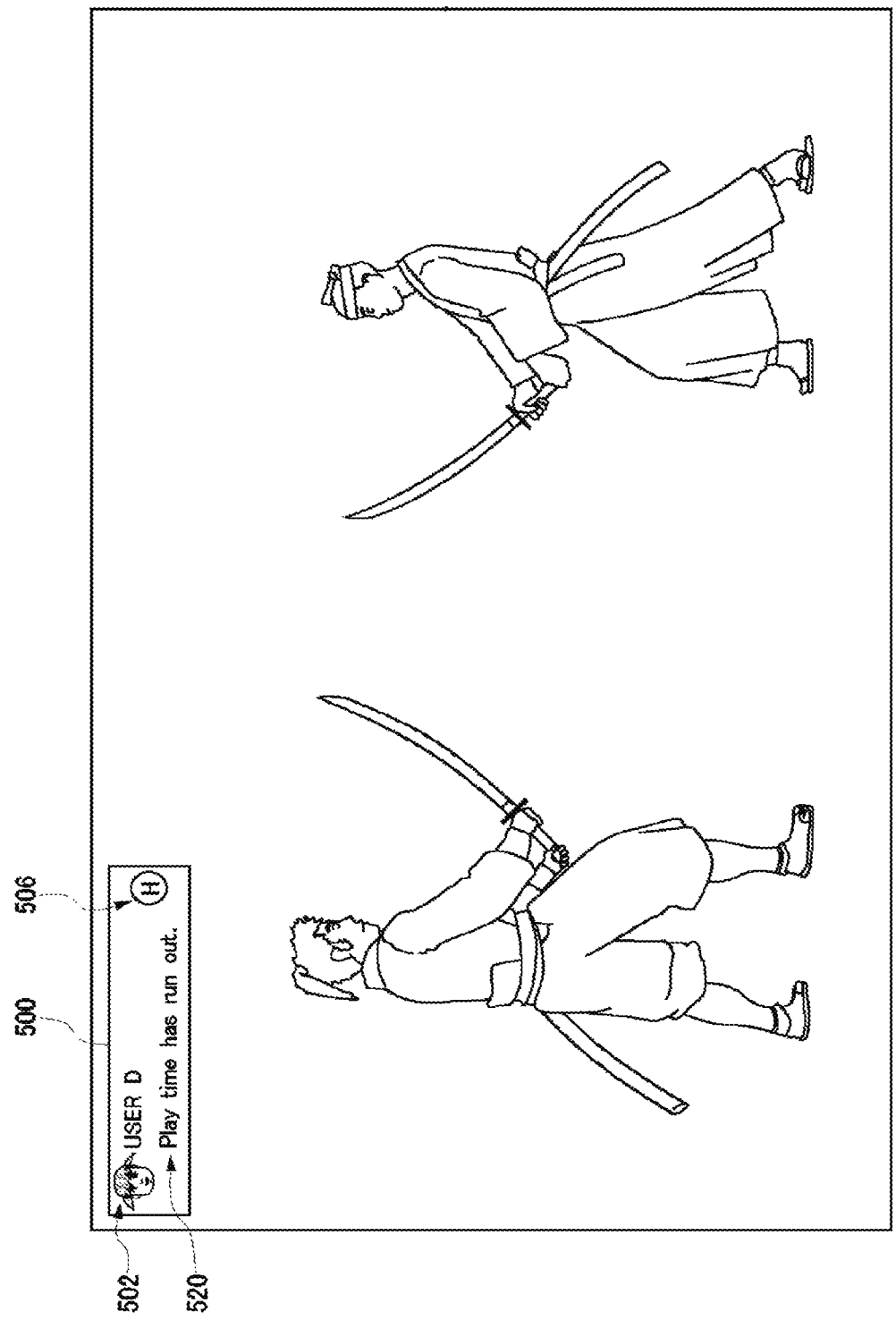
FIG. 10 is a diagram illustrating another example of the message superimposed and displayed on the game screen.

FIG. 10 illustrates another example of the message superimposed and displayed on the game screen. Within the message window 500, the limit processing unit 114 collectively displays the user specification information 502 for specifying the user D and the message 520 indicating by a text that the play permission time has run out.

The message 520 indicates "Play time has run out," and that the remaining time of the play permission time is zero. When the user D depresses the home button of the input device 6, the limit processing unit 114 displays the detailed screen regarding the play time on the output device 4 in place of the game screen.

In addition, after the remaining time of the play permission time is zero, the limit processing unit 114 may allow a game play of the user D to be continued or forcibly terminated. In the case of the former, by viewing the message 520, the user D may preferably recognize that the play time is beyond the play permission time and terminate the game spontaneously. In the case of the latter, when a forcible termination is performed without previous notice, a chance for saving the game is not given to the user D. Therefore, preferably, the limit processing unit 114 may stepwise superimpose and display a playable time of the user D on the game screen. This process permits the user D to save the game before the forcible termination.

Meanwhile, in the case in which the game play is not forcibly terminated, the limit processing unit 114 may perform push notification indicating that the play permission time of the user D has run out to the terminal device 16 of the users A and B who are parents via the server device 5. Through this process, the users A and B can know that the play permission time of the user D has run out and, when the user D continues the play yet, know the above fact.

Figure 11:
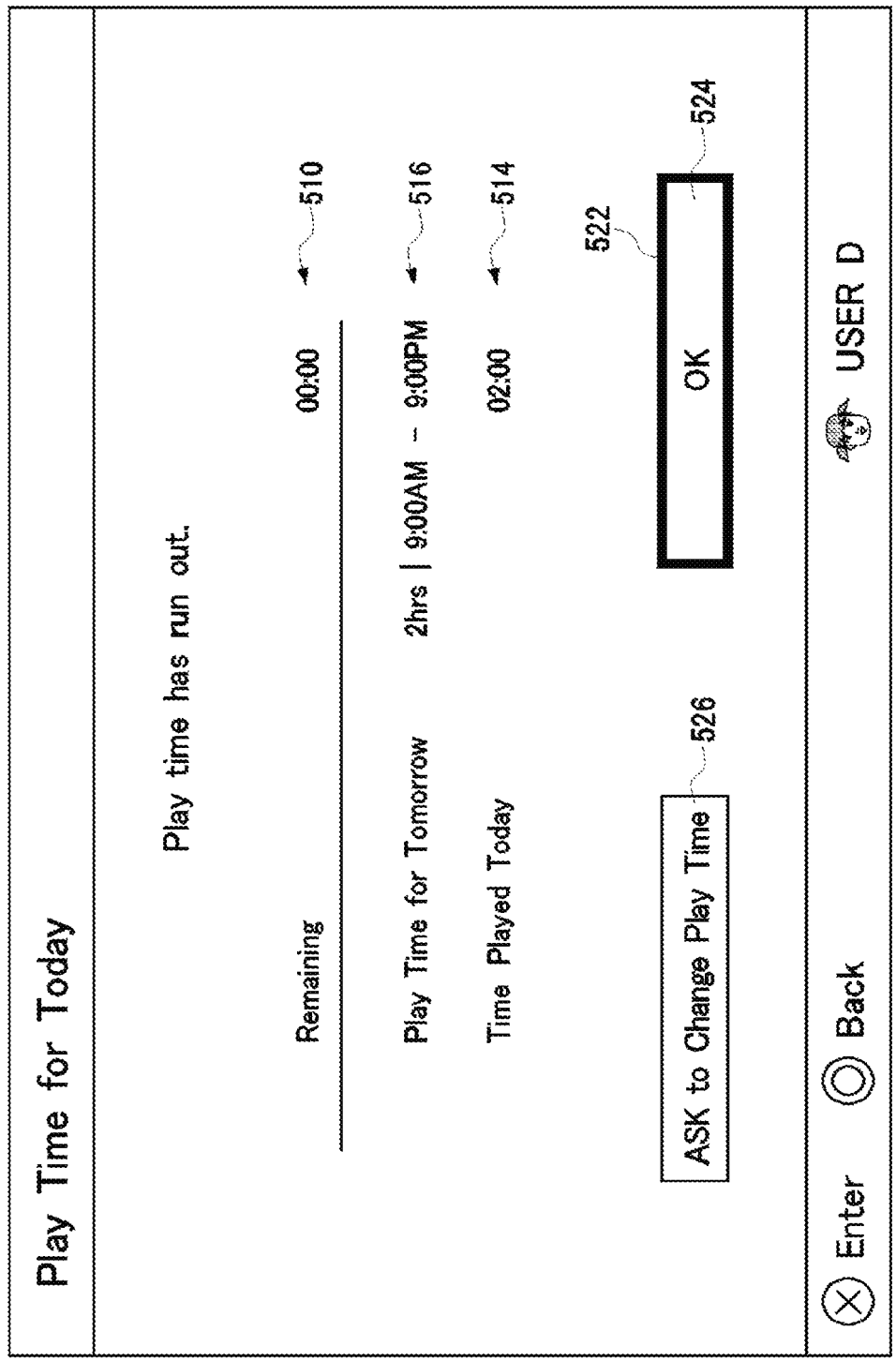
FIG. 11 is a diagram illustrating another example of the detailed screen regarding the play time.

FIG. 11 illustrates another example of the detailed screen regarding the play time. In the remaining time display column 510, the remaining time of the play permission time for today is display on the detailed screen. In this example, it is indicated that the remaining time of the play permission time is zero. In a play permission time display column 516, since the play permission time for today is zero, the play permission time and the play time slot for tomorrow are displayed. In the play time display column 514, the accumulated play time for today is displayed.

In the case in which the play permission time for today is zero in this manner, the limit processing unit 114 may preferably display information regarding the play time for tomorrow in the play permission time display column 516. This process permits the user D to confirm the information regarding the play time for tomorrow.

In the detailed screen, two GUIs (Graphical User Interfaces) for determining a screen transition destination are prepared. One GUI is an OK region 524 and when the user D matches the focus frame 522 with the OK region 524 and operates an enter button of the input device 6, the display screen transits to a log-in screen or a menu screen. Another GUI is a request region 526 and when the user D matches the focus frame 522 with the request region 526 and operates the enter button of the input device 6, the extension request for the play permission time is transmitted to the terminal device 16 of the users A and B having the setting authority of the parental controls. The extension request will be described below.

In the server device 5, as described above, the play time acquisition unit 222 acquires information regarding the game play time of the users D and E to which the parental control information is set from the information processing device 10 and/or the information processing device 14. Through this process, in response to a request from the terminal device 16 of the manager and the guardian, the screen data providing unit 220 can transmit the screen data including information indicating the play time of the users D and E to which the parental control information is set to the terminal device 16. Accordingly, the manager and the guardian can confirm information regarding the play time of the children through the terminal device 16 even if outside of his/her house.

In the information processing system 1, the user D can log in to the server device 5 and play a game by using the information processing device 14 of friend's house. At this time, the play time acquisition unit 222 acquires a measurement time for play of the user D from the information processing device 14. The play time acquisition unit 222 may accumulate the play time in both the information processing device 10 and the information processing device 14 and transmit the screen data including information indicating a total play time to the terminal device 16 of the manager and the guardian. Even in the case in which the user D performs a game play by using a plurality of information processing devices, the server device 5 acquires information regarding play circumstances from the information processing devices in this manner, and thereby the play time acquisition unit 222 can derive the total play time and present the total play time to the terminal device 16.

Figure 12:
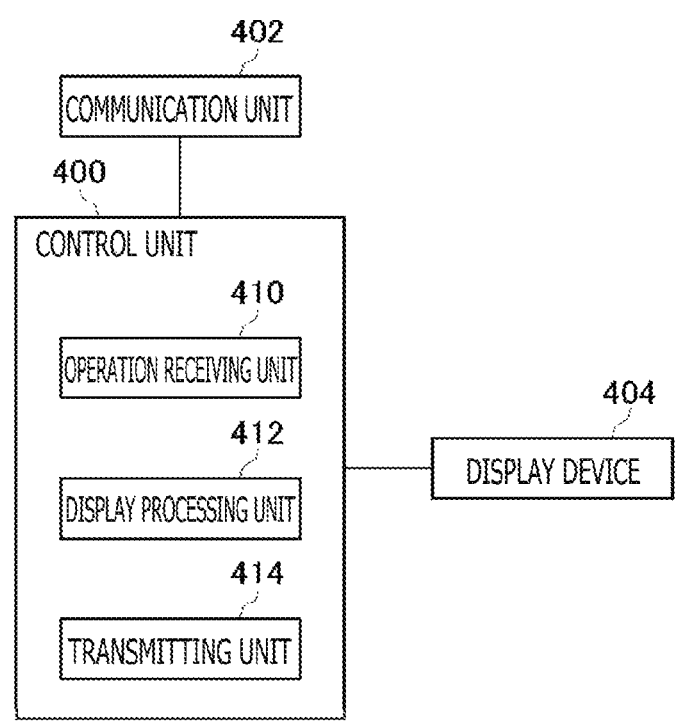
FIG. 12 is a diagram illustrating a configuration of a terminal device.

FIG. 12 illustrates a configuration of the terminal device 16. The terminal device 16 may be a portable user terminal such as a smartphone and includes a communication unit 402, a display device 404, and a control unit 400. The control unit 400 has an operation receiving unit 410, a display processing unit 412, and a transmitting unit 414. The communication unit 402 of the terminal device 16 transmits and receives data to and from the communication unit 202 of the server device 5 via the network 3.

Each component described as functional blocks that perform various processes in FIG. 12 can be configured, in hardware, from circuit blocks, memories and other LSIs and are implemented, in software, by a program loaded in a memory and the like. Accordingly, it is recognized by those skilled in the art that the functional blocks can be implemented in various forms from only hardware, only software or a combination of them and are not limited to any of them.

The users A and B can access the server device 5 from the information processing device 10 and/or the terminal device 16 and monitor the play time of the users D and E that are the children. Hereinafter, the processes in which the user A operates the terminal device 16 and allows the server device 5 to display a family management screen will be described.

When the operation receiving unit 410 receives a display request of the family management screen from the user A, the communication unit 402 is connected to the server device 5 via the network 3 and the transmitting unit 414 transmits the display request to the server device 5. In the server device 5, the play time acquisition unit 222 acquires the play time for one day of the users D and E to which the parental controls are set from the information processing device 10 and/or the information processing device 14. The screen data providing unit 220 generates screen data in which the play time of the users D and E is associated with information for specifying the users D and E and provides the screen data to the terminal device 16. In the terminal device 16, the communication unit 402 receives the screen data and the display processing unit 412 displays the family management screen on the display device 404.

Figure 13:
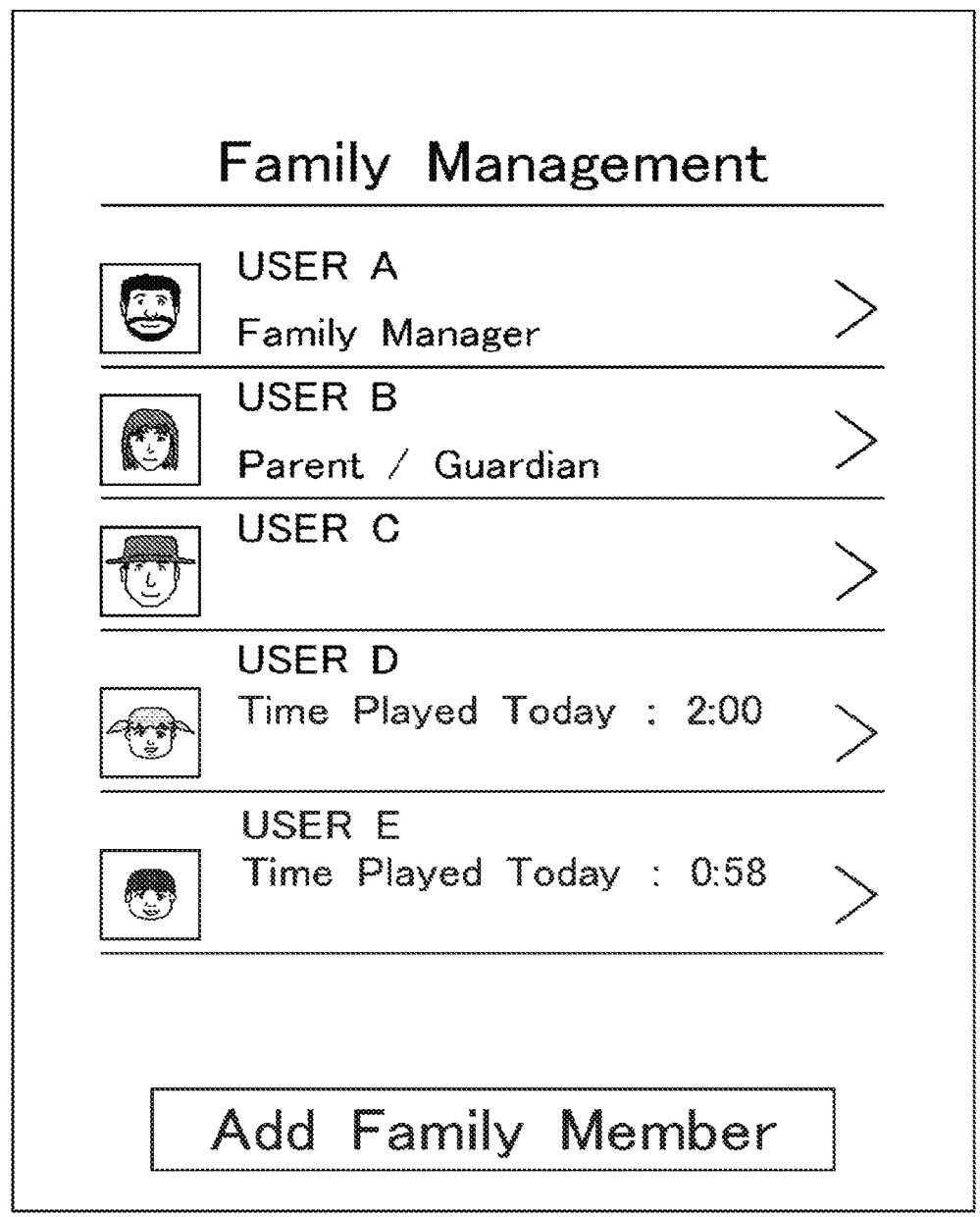
FIG. 13 is a diagram illustrating an example of a family management screen.

FIG. 13 illustrates an example of the family management screen. In the family management screen, a plurality of user regions including the user specification information including user names and user icons are arrayed. In this example, the user regions of all the users A to E composing a family group are arrayed in a longitudinal direction and the accumulated play time for one day is included in the user regions of the users D and E to which the parental controls are set. Through this process, the user A can grasp the play time for today of the users D and E that are the children in the family management screen.

In an example illustrated in FIG. 13, the play time of the user D is two hours that is a play upper limit time. In the information processing device 10, in the case in which the limit processing unit 114 allows the user to play a game beyond the play permission time, the user D can play a game beyond two hours.

Figure 14:
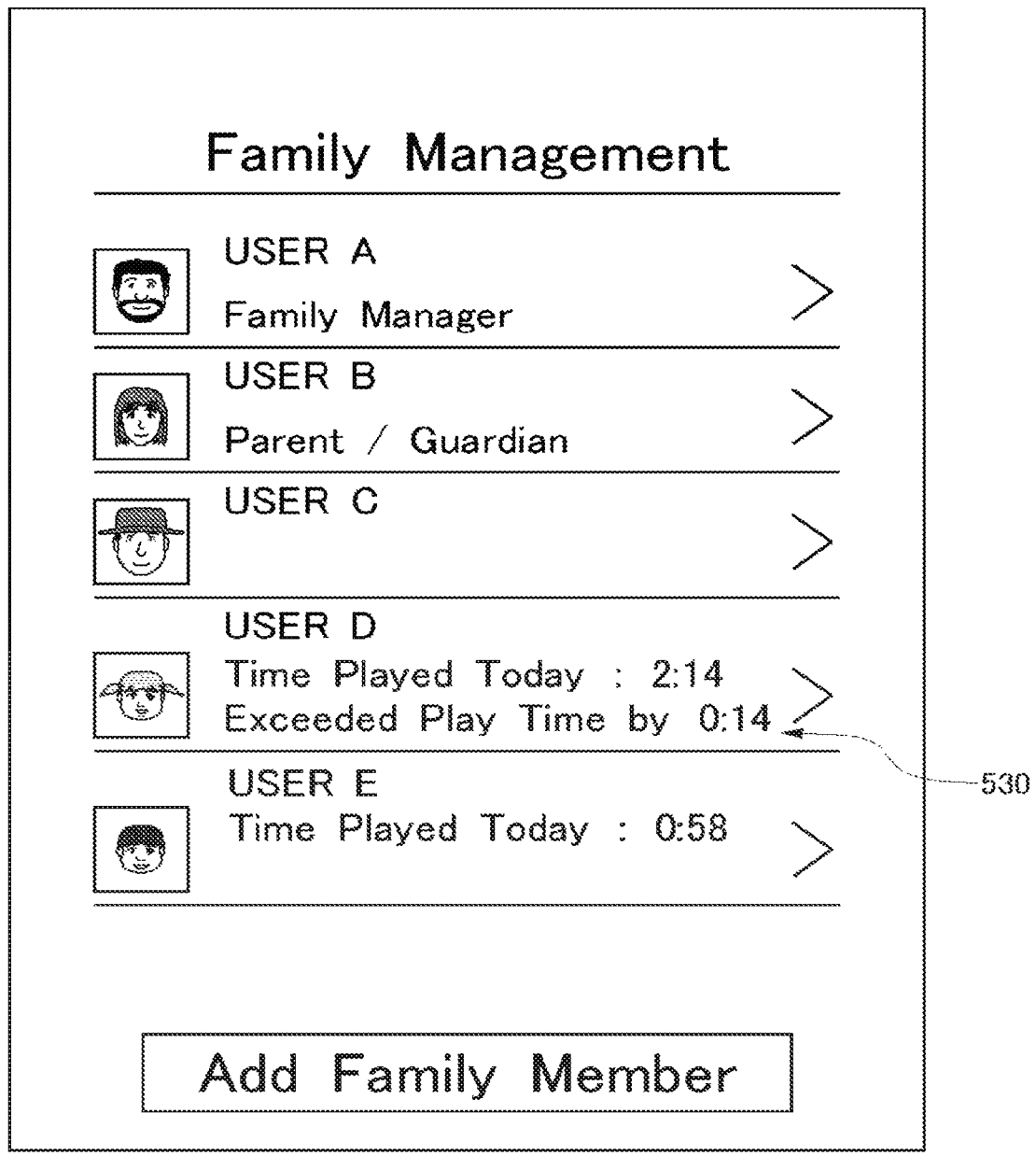
FIG. 14 is a diagram illustrating another example of the family management screen.

FIG. 14 illustrates another example of the family management screen. In this example, the play time of the user D is two hours and 14 minutes and an excess from the play permission time is 14 minutes. Therefore, in the user region of the user D of the family management screen, an excess time notification message 530 indicating a play excess time of the user D is included. The excess time notification message 530 may be preferably displayed, for example, in a color different from those of other messages so that the user A can easily recognize the excess time notification message 530.

When the user A selects the user region of the user D in the family management screen, the operation receiving unit 410 receives a display request of the management screen of the parental control information of the user D, and the transmitting unit 414 transmits the display request to the server device 5 via the communication unit 402. In the server device 5, the screen data providing unit 220 reads the parental control information of the user D from the profile management unit 212, generates screen data regarding a parental control management, and provides the screen data to the terminal device 16.

Figure 15:
FIG. 15 is a diagram illustrating an example of a management screen of parental controls.

FIG. 15 illustrates an example of the management screen of the parental controls. In the terminal device 16, the communication unit 402 receives the screen data and the display processing unit 412 displays the parental control management screen of the user D on the display device 404. The management screen is a screen for managing and setting the play time for today.

In the profile management unit 212 of the server device 5, in the case in which the setting information (play permission time) for limiting the play time in one day of the user D is held, the screen data providing unit 220 generates screen data including a today play time change button 540 for changing the setting information just for today and provides the screen data to the terminal device 16. The today play time change button 540 is a GUI for changing the play permission time for today.

Figure 16:
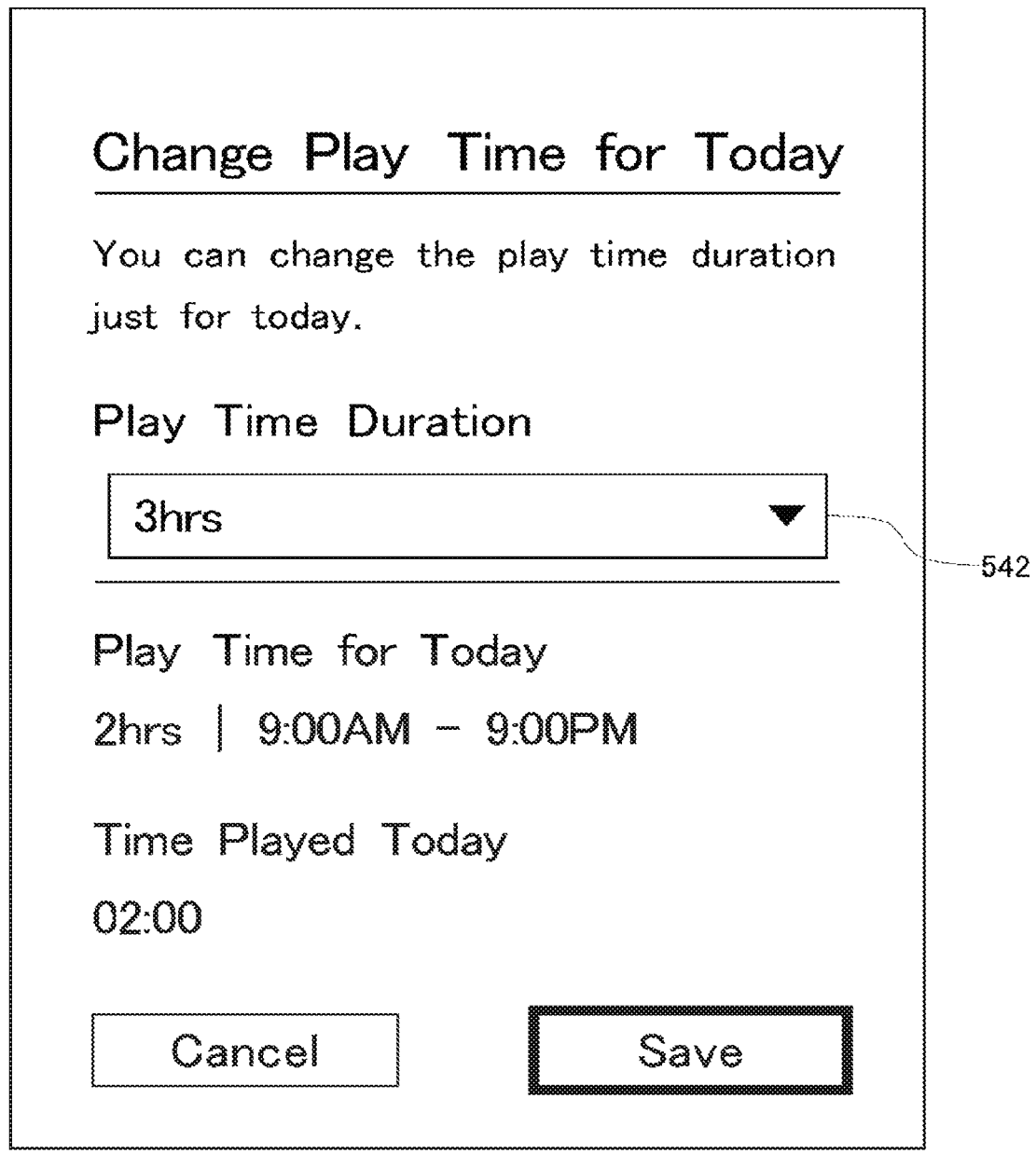
FIG. 16 is a diagram illustrating an example of a today play time change screen.

FIG. 16 illustrates an example of a today play time change screen. In the today play time change screen, a play time change column 542 for changing the play permission time only for today is displayed and the user A can change the play permission time for today from a pulldown menu of the play time change column 542. In this example, the play permission time of two hours is originally set to the user D; however, applying only to today, the user A selects three hours in the play time change column 542 and extends the play permission time by one hour. When the user A operates a "Save" button, the operation receiving unit 410 receives, as an operation to be recorded, the setting information in which the parental controls are changed and the transmitting unit 414 transmits the changed setting information to the server device 5 via the communication unit 402.

In the server device 5, the profile management unit 212 updates the play permission time for today of the user D to three hours. When the play permission time for today is updated, the message providing unit 224 generates a message indicating an extension of the play permission time of the user D and provides the message to the information processing device 10 to which the user D logs in.

Figure 17:
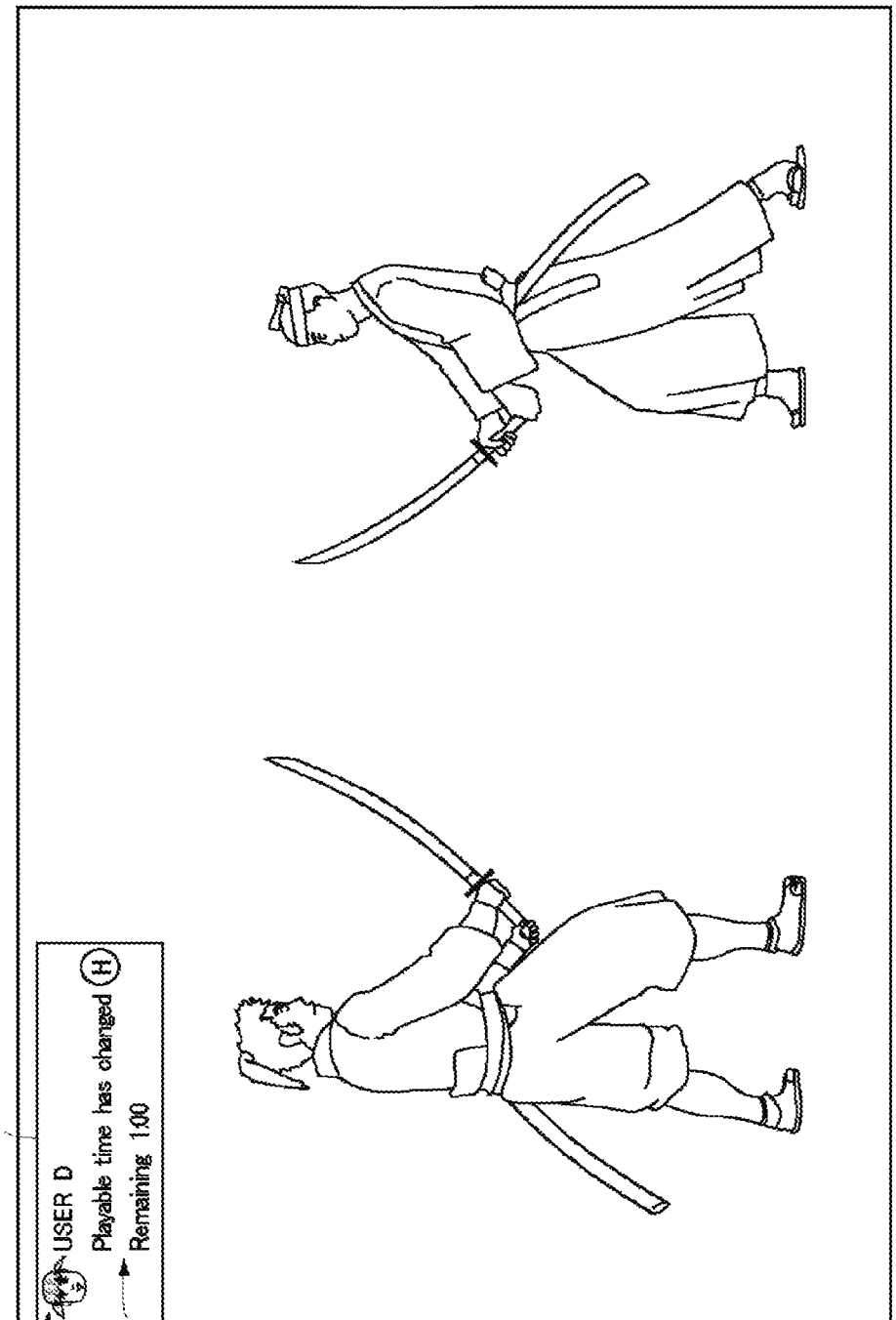
FIG. 17 is a diagram illustrating an example of the message superimposed and displayed on the game screen.

FIG. 17 illustrates an example of the message superimposed and displayed on the game screen. The limit processing unit 114 displays the message window 500 on the upper-left corner of the game screen. The message window 500 includes the user specification information 502 for specifying the user D that is a notification destination of the message and a message 544 indicating the extension time by a text. In this example, the message 544 indicates "Remaining 1:00," and that the play permission time is changed and the remaining time is one hour.

In this manner, the user A having the setting authority of the parental controls can simply change only the play permission time for today. When the user D performs a game play with her friend, in the case in which it is difficult to play a game over two hours strictly, the user D is pitiful. Therefore, the user A may desire to extend the play permission time for today of the user D. In such a case, the user A can simply change the play permission time for today of the user D from the today play time change screen illustrated in FIG. 16. Note that the play permission time changed from the today play time change screen has an influence on only the play time for today absolutely and has no influence on the play time for tomorrow or later.

Meanwhile, the user D can request a change in the play permission time for today of the users A and B from the request region 526 illustrated in FIG. 11. In a play time detailed screen illustrated in FIG. 11, when the user D selects the request region 526, a change request of the play permission time for today may be automatically transmitted to the terminal device 16 of the users A and B having the setting authority of the parental controls via the server device 5. Through this process, the users A and B know that the user D hopes to extend the play permission time and can extend the play permission time immediately.

The present disclosure has been described in connection with the embodiment. This embodiment is illustrative, and it can be recognized by those skilled in the art that various modifications are possible in combination of the components and various processes of the embodiment and also such modifications fall within the scope of the present disclosure.

The limit processing unit 114 may display the remaining time of the play permission time not only on the game screen but also on various screens such as the menu screen for the user to which the play permission time is restricted.

What is claimed is:

1. An information processing device comprising:
a holding unit configured to hold setting information regarding parental control for each of a plurality of users in association with respective user identification information for the plurality of users; and
a limit processing unit configured to limit usage of at least one predetermined function and/or at least one device as a function of the setting information held by the holding unit, wherein:
the holding unit holds the setting information regarding the parental control in association with the user identification information for one or more of the plurality of users that are under a predetermined age in a family group to which the plurality of users belong,
the plurality of users belonging to the family group are divided into one or more adult users and one or more child users, when they are under the predetermined age, one user among the one or more adult users is registered as a family manager that manages the family group, and at least a setting authority regarding the parental control is given to the family manager,
when there is another user among the one or more adult users in the family group, such other adult user may be registered as a user having setting authority regarding the parental control on a basis of designation by the family manager,
when a play permission time, for at least one of the child users, to play a game application running on the information processing device is established in the setting information, the limit processing unit measures the play time in a given day for such at least one child user, and
the limit processing unit generates and superimposes on a game screen a message regarding any remaining time in a stepwise fashion for the at least one child user when the measurement indicates that not all of the play permission time has elapsed, and forcibly terminates game play of the user when the remaining time of the play permission time has elapsed.

2. The information processing device according to claim 1, further comprising: a registration processing unit configured to receive an update of the setting information regarding the parental control from a server device and update the setting information regarding the parental control held by the holding unit.

3. A parental control method comprising:
holding setting information regarding parental control for each of a plurality of users in association with respective user identification information for the plurality of users; and
limiting usage of at least one predetermined function and/or at least one device of an information processing device as a function of the held setting information, wherein:
the holding includes holding the setting information regarding the parental control in association with the user identification information for one or more of the plurality of users that are under a predetermined age in a family group to which the plurality of users belong, the plurality of users belonging to the family group are divided into one or more adult users and one or more child users, when they are under the predetermined age, one user among the one or more adult users is registered as a family manager that manages the family group, and at least a setting authority regarding the parental control is given to the family manager, when there is another user among the one or more adult users in the family group, such other adult user may be registered as a user having setting authority regarding the parental control on a basis of designation by the family manager, when a play permission time, for at least one of the child users, to play a game application running on the information processing device is established in the setting information, a measurement of the play time in a given day for such at least one child user is made, and a message is generated and superimposed on a game screen regarding any remaining time in a stepwise fashion for the at least one child user when the measurement indicates that not all of the play permission time has elapsed, and forcibly terminates game play of the user when the remaining time of the play permission time has elapsed.

4. A non-transitory, computer readable storage medium containing a program, which when executed by a computer, causes the computer to carry out actions, comprising:

holding setting information regarding parental control for each of a plurality of users in association with respective user identification information for the plurality of users; and limiting usage of at least one predetermined function and/or at least one device of an information processing device as a function of the held setting information, wherein:

the holding includes holding the setting information regarding the parental control in association with the user identification information for one or more of the plurality of users that are under a predetermined age in a family group to which the plurality of users belong, the plurality of users belonging to the family group are divided into one or more adult users and one or more child users, when they are under the predetermined age, one user among the one or more adult users is registered as a family manager that manages the family group, and at least a setting authority regarding the parental control is given to the family manager, when there is another user among the one or more adult users in the family group, such other adult user may be registered as a user having setting authority regarding the parental control on a basis of designation by the family manager, when a play permission time, for at least one of the child users, to play a game application running on the information processing device is established in the setting information, a measurement of the play time in a given day for such at least one child user is made, and a message is generated and superimposed on a game screen regarding any remaining time in a stepwise fashion for the at least one child user when the measurement indicates that not all of the play permission time has elapsed, and game play of the user is forcibly terminated when the remaining time of the play permission time has elapsed.

5. A server device comprising:

a sign-in registration unit configured to carry out a sign-in registration process of a network service of a plurality of users of respective information processing devices and generates a respective network account for each of the plurality of users; and a profile management unit configured to manage respective profile information for the plurality of users in association with the respective network account of each of the plurality of users, wherein:

the profile management unit holds setting information regarding parental control over at least one of the plurality of users in association with the respective network account of the at least one user, the profile management unit holds profile information including the setting information regarding parental control of an offline profile user in association with one of the respective network accounts of one of the plurality of users who manages a group to which the offline profile user belongs in the information processing device of such one of the plurality of users, the offline profile user: (i) is registered as a user of a respective one of the information processing devices, (ii) has a local account which is used when the offline profile user logs into the respective one of the information processing devices, and (iii) does not have one of the respective network accounts which is used when the plurality of users sign into the server device, when sign-in registration work of the offline profile user is performed, the sign-in registration unit generates a network account for the offline profile user, and the profile management unit holds the profile information of the offline profile user in association with the generated network account, and the profile management unit does not hold the profile information of the offline profile user in association with one of the respective network accounts of one of the plurality of users who manages a group to which the offline profile user belongs in the information processing device of such one of the plurality of users.

6. The server device according to claim 5, further comprising: a screen data providing unit configured to provide screen data for performing setting or a setting change regarding the parental control for a user terminal different from the respective information processing devices.

7. The server device according to claim 6, wherein when the profile management unit holds setting information for limiting a play time in one day, the screen data providing unit provides screen data for changing the setting information just for today to the user terminal.

8. The server device according to claim 6, further comprising:

a play time acquisition unit configured to acquire the play time for one day of a user to which the parental control is set, wherein the screen data providing unit provides screen data obtained by associating the play time of the user with information for specifying the user to the user terminal.

9. A profile information management method comprising:

carrying out a sign-in registration process of a network service of a plurality of users of respective information processing devices and generates a respective network account for each of the plurality of users;

managing respective profile information for the plurality of users in association with the respective network account of each of the plurality of users;

holding setting information regarding parental control over at least one of the plurality of users in association with the respective network account of the at least one user; and holding profile information including the setting information regarding parental control of an offline profile user in association with one of the respective network accounts of one of the plurality of users who manages a group to which the offline profile user belongs in the information processing device of such one of the plurality of users, wherein the offline profile user: (i) is registered as a user of a respective one of the information processing devices, (ii) has a local account which is used when the offline profile user logs into the respective one of the information processing devices, and (iii) does not have one of the respective network accounts which is used when the plurality of users sign into the server device, when sign-in registration work of the offline profile user is performed, the sign-in registration process includes generating a network account for the offline profile user, and the profile information of the offline profile user is held in association with the generated network account, and the profile information of the offline profile user is not held in association with one of the respective network accounts of one of the plurality of users who manages a group to which the offline profile user belongs in the information processing device of such one of the plurality of users.

10. A non-transitory, computer readable storage medium containing a program, which when executed by a computer, causes the computer to carry out actions, comprising:

carrying out a sign-in registration process of a network service of a plurality of users of respective information processing devices and generates a respective network account for each of the plurality of users;

managing respective profile information for the plurality of users in association with the respective network account of each of the plurality of users;

holding setting information regarding parental control over at least one of the plurality of users in association with the respective network account of the at least one user; and holding profile information including the setting information regarding parental control of an offline profile user in association with one of the respective network accounts of one of the plurality of users who manages a group to which the offline profile user belongs in the information processing device of such one of the plurality of users, wherein the offline profile user: (i) is registered as a user of a respective one of the information processing devices, (ii) has a local account which is used when the offline profile user logs into the respective one of the information processing devices, and (iii) does not have one of the respective network accounts which is used when the plurality of users sign into the server device, when sign-in registration work of the offline profile user is performed, the sign-in registration process includes generating a network account for the offline profile user, and the profile information of the offline profile user is held in association with the generated network account, and the profile information of the offline profile user is not held in association with one of the respective network accounts of one of the plurality of users who manages a group to which the offline profile user belongs in the information processing device of such one of the plurality of users.

* * * * *